Jan. 12, 1943. G. J. SNYDER 2,308,118
PANEL MANIPULATING DEVICE
Filed Dec. 30, 1939 4 Sheets-Sheet 1

INVENTOR.
GILBERT J. SNYDER.
BY
Oltsch & Knoblock
ATTORNEYS.

Jan. 12, 1943.  G. J. SNYDER  2,308,118
PANEL MANIPULATING DEVICE
Filed Dec. 30, 1939    4 Sheets-Sheet 3

INVENTOR.
GILBERT J. SNYDER.
BY
Oltsch & Knoblock
ATTORNEYS.

Jan. 12, 1943. G. J. SNYDER 2,308,118
PANEL MANIPULATING DEVICE
Filed Dec. 30, 1939 4 Sheets-Sheet 4

INVENTOR.
GILBERT J. SNYDER.
BY
Altsch & Knoblock
ATTORNEYS.

Patented Jan. 12, 1943

2,308,118

UNITED STATES PATENT OFFICE 2,308,118

PANEL MANIPULATING DEVICE

Gilbert J. Snyder, South Bend, Ind., assignor to Mastic Asphalt Corporation, South Bend, Ind., a corporation of Indiana Application December 30, 1939, Serial No. 311,916

6 Claims. (Cl. 198—34)

This invention relates to panel manipulating devices and more particularly to a device for manipulating a building covering panel during the process of manufacture thereof.

In the manufacture of building covering material of the type comprising a base formed of composition or insulation board which is coated with weather proofing material to which mineral surfacing particles are applied and impressed for the purpose of providing a decorative appearance, it is necessary that the panels take different positions with respect to each other while undergoing different phases of the manufacturing process. For example, during the time that the waterproofing material and the surfacing particles or grit are being applied to a face of the panel, it is desirable that the panels be moved through the machine in edge abutment. Thereafter while the waterproofing material is being cooled and set, and during the operation of impressing ornamental designs on the coated face thereof, it is desirable that the panels be spaced apart. Also it is desirable that this manipulation should be accomplished mechanically in order to achieve a high rate of production and to retain the cost of the finished product at the lowest possible figure.

Therefore, it is the primary object of this invention to provide a device for separating panels which are fed thereto in edge abutment and thereafter continue the feed of the panels in predetermined spaced relation.

A further object is to provide a device of this character by means of which panels fed thereto in abutting relation may be separated and fed in controlled relation to a continuously operating conveyor unto which they are discharged by a separating means.

A further object is to provide a device of this character with means for automatically stopping the same if the panels are not properly positioned on the conveyor to which they are delivered by the separating means.

A further object is to provide a device of this character having separating means which include friction rollers operating at a speed higher than that at which the panels are fed thereto in edge abutment.

A further object is to provide a device of this character having novel means for releasing high speed separating rolls in the event panels buckle or overlap as fed thereto.

A further object is to provide a device of this character having panel supporting means comprising a plurality of spaced concentric disks which insure flat positioning of a panel which is engaged by a pressure roll without requiring a substantial area of contact between the panel and the supporting means.

A further object is to provide a device of this character having novel means for separating panels coated with asphalt and grit, for pressing in the grit, and then feeding the panels in predetermined spaced relation.

Other objects will be apparent from the description and appended claims.

Figure 1:
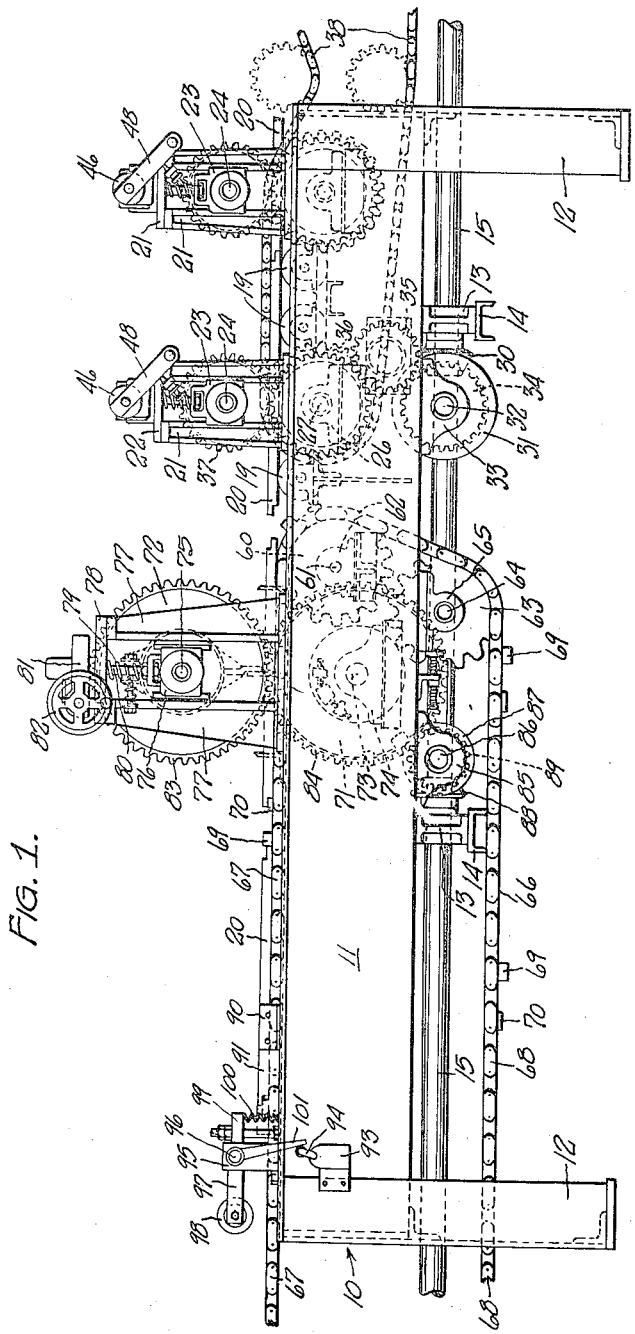
Fig. 1 is a view of the device in side elevation.

Referring to the drawings which illustrate the preferred embodiment of the invention, the numeral 10 designates a frame of the device which comprises suitable interconnected side rails 11 and upright supporting members 12. A plurality of bearings 13 are carried by the frame 10 at one side thereof, as on suitable brackets 14, and serve to journal an elongated main drive shaft 15 which serves to drive the instant device and is preferably also connected with other parts of the panel processing mechanism.

Figure 2:
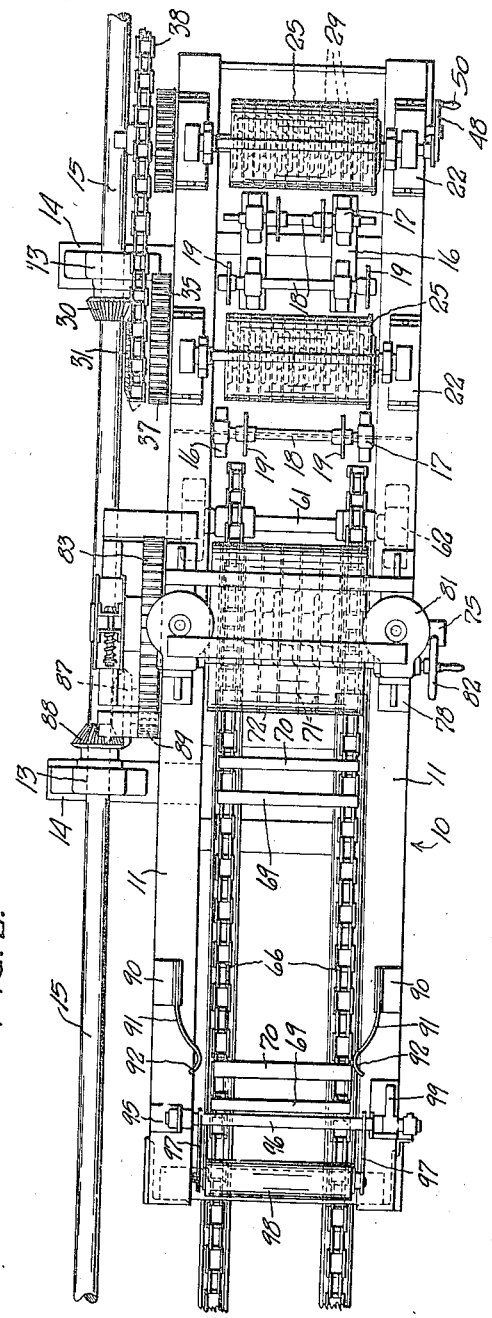
Fig. 2 is a top plan view of the device.
Figure 3:
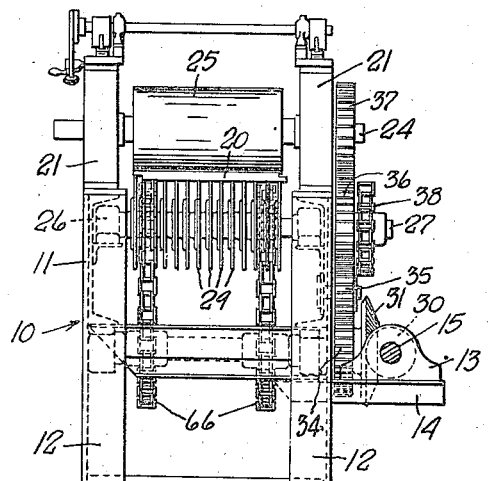
Fig. 3 is an end view of the device as viewed from the right in Fig. 1.

Adjacent the feed end of the device as viewed at the right in Figs. 1 and 2, are provided a plurality of supporting members 16 positioned between the frame rails 11 and journaling at 17 spaced transversely shafts 18 which carry a plurality of disks 19. These disks 19 constitute idlers which are arranged in staggered relation with respect to each other, and the uppermost portion thereof is positioned slightly above the upper edge of the side rails 11 of the frame. Disks 19 are adapted to support panels 20 fed from the right in Fig. 1 in edge abutment as illustrated.

Adjacent the disks 19, each side rail 11 of the frame of the device mounts one or more pairs of spaced vertical guide members 21, and each pair is interconnected by a cross bar 22. Each pair of guide members 21 is transversely aligned with similar guide members upon the opposite frame rail 11, and each mounts a bearing 23 which is vertically adjustable on guides 21 and serves to journal one end of a shaft 24 on which a roller 25 is fixedly mounted.

Below each of the rollers 25 is mounted a bearing 26 which journals a shaft 27 and fixedly mounts a plurality of concentric disks 29 which are equally spaced on shaft 27, there being a plurality of said disks for purposes to be hereinafter set forth. Panels 20 fed to the device on disks 19 are adapted to pass between the disks 29 and the rollers 25.

Shaft 15 carries a bevel gear 30 with which a bevel gear 31 mounted on a shaft 32 journaled in a bearing 33 carried by frame 11 meshes. Shaft 32 also mounts a gear 34 which meshes with a gear 35 suitably journaled in bearings (not shown) carried by the side rails. Gear 35 in turn meshes with a gear 36 mounted on shaft 27, and a gear 37 is mounted on shaft 24 to normally mesh with gear 36. It will thus be seen that the roller 25 and disks 29 are positively driven from the main shaft 15 in timed relation.

In the event there are two or more set of rollers 25 and disks 29 as illustrated, a suitable chain or other driven means 38 may be trained around suitable sprockets on each of the driven shafts 27 for the disks 29, and other gears may be provided to drive the shaft 24 of each upper roller 25 directly from the shaft 27 therebelow.

Figure 5:
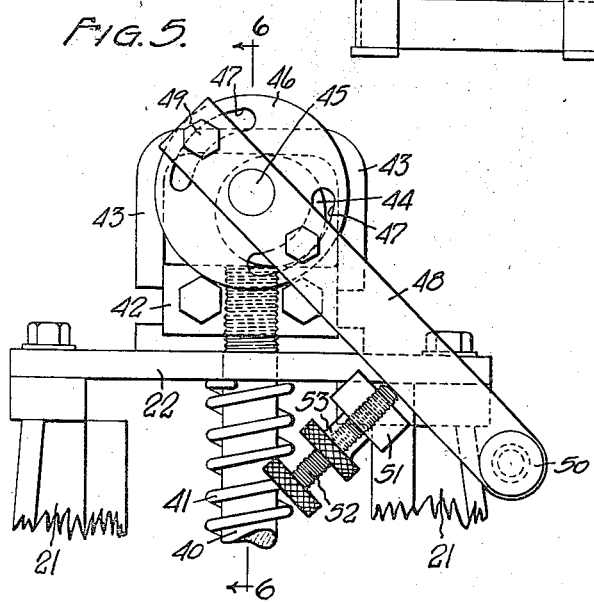
Fig. 5 is an enlarged fragmentary detail sectional view of the device in side elevation.
Figure 4:
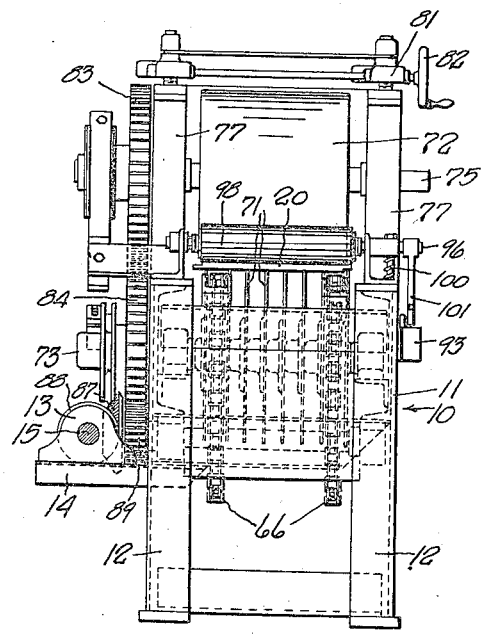
Fig. 4 is an end view of the device as viewed from the left in Fig. 1.
Figure 6:
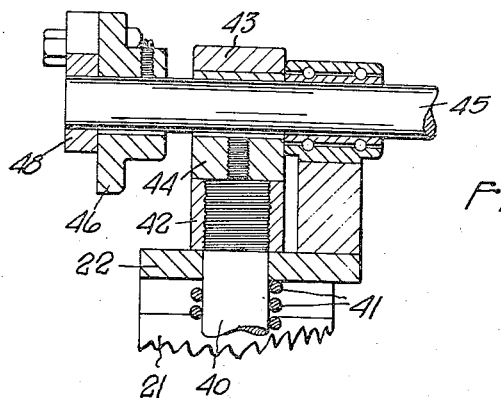
Fig. 6 is an enlarged fragmentary vertical sectional view taken on line 6—6 of Fig. 5.

Suitable means are provided for controlling the adjusted position of the upper rollers 25 with respect to the disks 29, as best illustrated in Figs. 5 and 6. In this construction each of the bearings 23 is provided with a shaft 40 extending upwardly therefrom and encircled by coil springs 41 whose opposite ends bear upon the bearing 23 and the cross piece 22, respectively. The upper end of shaft 40 extends freely through the cross piece 22 and has a threaded connection with a shoe 42 which carries a yoke 43 fixedly secured thereto and constituting a camway. A circular member or disk 44 is positioned in each cam-way and has fixedly connected thereto a transverse shaft 45. In spaced relation to the disk 44, a disk 46 is concentrically mounted on shaft 45 and is provided with a pair of opposed elongated arcuate slots 47. A lever 48 is fixedly mounted on the shaft 45 adjacent disk 46 and is provided with bolts 49 extending through and fixedly secured to the disk 46 at slots 47. It will thus be observed that when the lever 48 is rotated, the disk 44 will likewise be rotated and the eccentric mounting of said disk 44 with respect to shaft 45 constitutes a cam whereby pivoting of the lever 48 will serve to raise and lower the block 42 and yoke 43 constituting the cam-way, and thus raise and lower the shaft 40 and bearings 23. Lever 48 may be provided with a suitable handle 50 for convenient operation thereof. Cross piece 21 has mounted thereon a stop member 51 in which is threaded a set screw 52 preferably having a knurled head. A lock nut 53 may be threaded on the set screw 52. Screw 52 serves to hold the arm 48 in desired operative position from which the arm may be readily manually shifted for the purpose of operating the cam disk 44 to raise the bearings 23 and rollers 25 as will be obvious.

Adjacent the innermost of the idler rollers 19 which support the panels 20 at the feed end of the unit, is positioned a pair of suitable sprockets 60 mounted on a shaft 61 journaled in suitable bearings 62 carried by the frame rails 11. Below and slightly rearwardly from sprockets 60 and vertically aligned therewith are similar sprockets 63 mounted on a shaft 64 journaled in bearings 65 depending from the frame rails 11. A pair of chains 66 extend over said sprockets, the upper runs 67 of said chains extending horizontally rearwardly of the unit with their upper surfaces substantially aligned with the upper surfaces of the rollers 19. The lower runs 68 of the chains extend horizontally below the frame rail 11. The chains 66 carry connecting bars 69 which are adapted to engage the rear ends of panels 20 mounted on the upper runs 67 of the chains, and also carry bars 70 extending between the chains and adapted to abut the undercut front edges of panels 20 mounted on the upper runs of the chains. At least one of the sprockets (not shown) around which the chains 66 run, and preferably at the left-hand end of the chains, as viewed in Fig. 1 is adapted for driving connection with the main shaft 15 of the device as will be obvious.

Slightly rearwardly spaced from the sprockets 60 are a pair of presser members 71, 72. The lower member 71 constitutes a series of spaced concentric disks mounted on a shaft 73 journaled in suitable bearings 74 carried by the frame rails 11. The upper member 72 constitutes a roller mounted on a shaft 75 which is journaled in bearings 76 slidable in suitable vertical guides 77. Each set of guides 77 carries a bridge or cross-piece 78 at the upper end thereof against which presses the upper end of a coil spring 79 encircling a shaft 80 from which bearing 76 depends. Shaft 80 extends into a gear housing 81 having gearing controlled by a hand wheel 82 for the purpose of raising and lowering shaft 80 and roller 72. Roller 72 has fixedly associated therewith a gear 83 of greater diameter than itself and member 71 has a similar gear 84 fixedly associated therewith, said gears 83 and 84 being adapted to mesh when members 71 and 72 are spaced apart the desired thickness of the panel 20. Frame rail 11 carries a bearing 85 journaling a shaft 86 which mounts a bevel gear 87 meshing with a bevel gear 88 on shaft 15. Shaft 86 also mounts a spur gear 89 adapted to mesh with gear 84 and thereby rotate said gear 84 and the gear 83 in timed relation to the shaft. The members 71 and 72 constitute means for pressing coating material, such as asphalt and grit previously applied to the panel, into given relation to the panel to control over-all panel thickness.

In rearwardly spaced relation to the members 71, 72, each of the frame rails 11 carry brackets 90 at their upper ends, and these brackets in turn carry leaf springs 91 which are bent inwardly from the brackets in the direction of travel of a panel on the chains 66, with their free ends 92 being bent outwardly. The free ends 92 of the springs 91 are spaced apart a distance slightly less than the width of the panels 20, whereby each panel conveyed on chains 66 which reaches said springs, is retarded thereby. However, the springs are of such strength that their retarding action is readily overcome without damaging the panel 20 when one of the cross bars 69 comes positively into contact with the rear end of the panel 20 to urge the same past such springs.

Rearwardly of the spring 91 is a suitable switch 93 which is electrically connected with the motor (not shown) for driving the shaft 15. Switch 93 is carried by the frame 10 of the unit, preferably on one of the side rails 11 below the upper edge thereof. Switch 93 has a suitable pivoted operating arm 94. The upper edges of the rails 11 carry suitable brackets 95 which journal a transverse shaft 96. Shaft 96 mounts an arm 97 adjacent each end thereof, and the free ends of arms 97 journal a roller 98 which is normally positioned with its lowermost portion adapted to either ride upon or to be just above the upper surface of a panel 20. Shaft 96 also mounts an arm 99 which has its free end connected by a spring 100 with a rail 11. Shaft 96 also mounts a depending arm 101 adapted to contact a lever 94.

In the operation of the device, panels 20 are fed to the unit in edge abutting relation by suitable means, (not shown), with said panels supported on the rollers 19. When the panels reach the separating rolls 25, which operate at high speed, they are individually propelled at increased speed and discharged from rollers 19 onto the chains 66, and pass between the pressing members 71, 72. After discharge of the panels from the pressing rolls, the panels are carried forwardly by the chains 66 until they contact the springs 91. If, at the time each panel 20 contacts springs 91, the rear end thereof is not being positively engaged by one of the presser bars 69, the springs 91 serve to retard the movement thereof on chains 66 until the succeeding presser bar 69 does contact the rear edge of panel 20. The presser bars 69 are so spaced from the preceding cross bar 70 that a panel will be effectively engaged at its opposite ends by said bars 69, 70. However, if the retarding action of the springs 91, or any other reason, causes the panels 20 to assume a tilted position, as for example a position with one end of a panel overlapping one of the bars 69, 70, or overlapping an adjacent panel 20, the increased height of the panel 20 as compared with its normal position upon the chains 66 will serve to bring it into engagement with the roller 98. This will raise the roller 98 to upwardly pivot the arms 97 against the action of spring 100 and thereby pivot the arm 101 in a manner to actuate the switch arm 94 and the switch 93. Assuming that the normal position of the switch 93 is closed circuit position, arm 94 will be pivoted by arm 101 to open circuit position, thereby stopping the drive motor to the shaft 15 and automatically stopping the herein described unit and all other units which are driven by the shaft 15. Hence all possibility of jamming of panels in feeding thereof to the chain 66 from edge abutting to spaced relation is positively prevented.

The construction illustrated in Figs. 5 and 6 by which the upper rollers 25 of the separator section of the device may be released in the event the panels being fed to the unit in edge abutment either buckle or slide with relation to each other to overlapping relation, constitutes a further safety device for the unit. That is, the levers 48 constitute means for disengaging the separating rolls 25 from the panels to prevent damage to the panels. It will be understood, of course, that when the rolls 25 are released, the machine may be stopped by any suitable means, as by manual operation of the adjacent control switch 93. In this way, the unit provides a simple and effective mechanism for separating panels fed thereto in edge abutting relation, while continuing their movement in the same direction. Hence panel processing, as pressing the coating thereof by members 71 and 72, is continued in proper sequence and timing without interference by reason of the separating action.

The formation of each of the members or units 29, 71 and 19 which support the coated panels 20 while beneath the rollers 25 and 72, from spaced concentric discs, is of considerable importance in a device of this character. The multiple point contact between the discs and the panel permits full lateral support of the panel, while at the same time limiting the extent of contact. Consequently, if asphalt or other coating material flows around the panel to the lower surface thereof during the coating thereof, minimum danger of sticking of the panel to the apparatus is encountered; and hence there is but small likelihood that the apparatus will be jammed in operation by reason of such sticking or adhesion.

I claim:

1. In combination, a pair of rotating panel contacting members, means for feeding panels in edge abutment between said members, said members having a circumferential speed exceeding the speed of said feed means, a conveyor receiving panels discharged by said rotating members, spaced panel-engaging means on said conveyor, and means for releasably gripping said panels while on said conveyor until engaged by said panel-engaging means.

2. Means for propelling a fibrous composition panel, comprising a frame, a conveyor shiftable on said frame, means for feeding panels to said conveyor at intervals, spaced abutments on said conveyor adapted for engagement with an edge of a panel on said conveyor, means for driving said conveyor, a normally operative controller for said drive means, and means shiftably carried by said frame for actuating said controller, said last named means being positioned adjacent to and clear of the normal path of said panels on said conveyor when said panels are in operative edge engagement with an abutment.

3. Means for propelling a compacted fibrous panel, comprising a frame, a conveyor shiftable on said frame, means for feeding panels to said conveyor in spaced relation, panel-engaging abutments on said conveyor, means for driving said conveyor, normally inoperative means for stopping said drive means, a member shiftable on said frame and adapted to actuate said stopping means, and means for normally positioning said shiftable member adjacent to and clear of the normal path of movement of panels on said conveyor when in operative edge-engagement with an abutment.

4. Means for propelling a compacted fibrous panel comprising a frame, a conveyor shiftable on said frame, means for consecutively feeding panels in said conveyor, panel-engaging abutments on said conveyor, drive means for said conveyor, and means for stopping said drive means including a switch, a bell-crank pivoted on said frame and adapted to actuate said switch, and spring means for normally positioning said bell-crank with one part thereof adjacent to and clear of the upper surface of a panel in normal position on said conveyor.

5. In combination, an elongated frame, a plurality of longitudinally spaced parallel idler rollers journaled transversely of the forward end portion of said frame, said rollers supporting horizontal panels propelled in edge abutment, a pair of driven rotatable members journaled transversely in said frame in spaced relation to and between adjacent rollers, said members engaging upper and lower faces of said panels and rotating at a speed greater than the speed at which said panels are propelled, said lower member comprising a plurality of spaced discs, a longitudinal conveyor carried by said frame and extending from a point adjacent the innermost conveyor, spaced parallel transverse panel-engaging abutments on said conveyor, a pair of spring members carried by said frame on opposite sides of said conveyor and spaced apart less than the width of a panel to successively retard movement of panels discharged on said conveyor, said springs being spaced from the feed end of said conveyor a distance at least equal to the length of a panel.

6. A panel feed device comprising an endless conveyor having spaced abutments, means for intermittently feeding panels onto said conveyor between said abutments, means juxtaposed to said conveyor for releasably restraining movement of a panel by said conveyor until an abutment engages the trailing edge of said panel, said conveyor and feed means being actuated by a common prime mover, and means for controlling said prime mover positioned adjacent the normal path of movement of a panel on said conveyor, said control means being actuable to inoperative position by a panel overlying an abutment.

GILBERT J. SNYDER.